US011128785B2

United States Patent
Davenel et al.

(10) Patent No.: US 11,128,785 B2
(45) Date of Patent: Sep. 21, 2021

(54) PROXIMAL MONITORING DEVICE

(71) Applicant: SAFRAN ELECTRONICS & DEFENSE, Paris (FR)

(72) Inventors: Arnaud Davenel, Paris (FR); Bruno Toulon, Paris (FR); Cédric Ollagnier, Paris (FR); Sébastien Vial, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/056,366

(22) PCT Filed: Jun. 14, 2019

(86) PCT No.: PCT/EP2019/065749
§ 371 (c)(1),
(2) Date: Nov. 17, 2020

(87) PCT Pub. No.: WO2019/238949
PCT Pub. Date: Dec. 19, 2019

(65) Prior Publication Data
US 2021/0227105 A1    Jul. 22, 2021

(30) Foreign Application Priority Data

Jun. 15, 2018 (FR) .................................. 18 00622

(51) Int. Cl.
H04N 5/225 (2006.01)
H04N 7/18 (2006.01)
B60R 25/30 (2013.01)
G02B 7/18 (2021.01)

(52) U.S. Cl.
CPC ......... *H04N 5/2252* (2013.01); *H04N 5/2258* (2013.01); *H04N 7/181* (2013.01); *B60R 25/305* (2013.01); *G02B 7/1805* (2013.01)

(58) Field of Classification Search
CPC .... H04N 5/2252; H04N 7/181; H04N 5/2258; B60R 25/305; G02B 7/1805
See application file for complete search history.

(56) References Cited

U.S. PATENT DOCUMENTS

| | | | |
|---|---|---|---|
| 9,921,464 B1 | 3/2018 | Choi | |
| 2011/0164108 A1 | 7/2011 | Bates et al. | |
| 2011/0249100 A1 | 10/2011 | Jayaram et al. | |
| 2014/0327733 A1 | 11/2014 | Wagreich | |
| 2015/0138311 A1 | 5/2015 | Towndrow | |
| 2016/0191813 A1* | 6/2016 | Wu | H04N 5/2252 348/159 |

OTHER PUBLICATIONS

Schwarze, Craig R. et al., "Risley prism scan-based approach to standoff trace explosive detection," Optical Engineering, Soc. of Photo-Optical Instrumentation Engineers, Bellingham, published Dec. 13, 2013, Feb. 1, 2014, vol. 53, Issue No. 2, pp. 21110-1-21110-8, (XP-060048344) (ISSN:0091-3286).

* cited by examiner

Primary Examiner — James C. Jones
(74) Attorney, Agent, or Firm — Muncy, Geissler, Olds & Lowe, P.C.

(57) ABSTRACT

The invention relates to a proximal monitoring device comprising a ring defining a volume in which a plurality of cameras is mounted. The cameras have fields that are angularly distributed around said ring and at least one of the cameras is associated with a device for scanning azimuthally in a plane normal to a central axis of the ring.

8 Claims, 2 Drawing Sheets

PROXIMAL MONITORING DEVICE

The present invention relates to the field of observation and surveillance of the surrounding environment of a building or of a vehicle from said building or vehicle.

More particularly, the invention relates to a proximal monitoring device designed to be fastened to the building or vehicle.

TECHNOLOGICAL BACKGROUND OF THE INVENTION

In order to reinforce the security of a given zone, it is necessary to be able to detect any presence and movement in the proximity of said zone.

To this end, a mast is generally used, at the top of which an optronics device is mounted that makes 360° observation possible.

The images collected by such a device are then analyzed directly from the place at which the device is situated, or from a center designed for that purpose, subject to said images being transmitted to it.

Such an optronics device conventionally includes a camera mounted on a support that is steerable so as to make it possible to provide vision through 360°. Such a camera does not make it possible to provide vision of the entire surrounding environment simultaneously.

It is also known that a plurality of cameras can be distributed at a plurality of places on a building so as to have an overall view of the surrounding environment of the building. Such an arrangement requires using cameras having wide-angle lenses so as to make it possible to provide vision that is as broad as possible, but such cameras are of limited range.

Object of the Invention

An object of the invention is thus to propose a proximal monitoring device that overcomes the above-mentioned drawbacks, at least to some extent.

PRESENTATION OF THE INVENTION

To this end, the invention relates to a proximal monitoring device comprising a ring defining a volume in which a plurality of cameras are mounted. The cameras have fields that are angularly distributed around said ring. And at least one of the cameras is associated with an azimuth scanning device for scanning azimuthally in a plane normal to a central axis of the ring.

The azimuth scanning device makes it possible, in particular, to increase the width of the field covered by the camera.

In accordance with a particular characteristic, the camera associated with the scanning device has a field that is smaller than a field of the other cameras, at least parallel to the scanning plane.

The azimuth scanning device thus makes it possible to use a camera that has a relatively long range and that also covers a field equivalent to the field of the other cameras by means of the azimuth scanning.

In accordance with another particular characteristic, the cameras are mounted in pairs on moving bracket plates for interchanging the positions of the cameras, each pair being mounted on a respective moving bracket plate, and the cameras in each pair being sensitive to mutually different wavelengths.

For example, one of the cameras in each pair may be sensitive to visible frequencies, and the other of the cameras in the pair may be sensitive to infrared frequencies. The device then makes it possible to provide nighttime and daytime proximal vision.

In a particular manner, with the cameras comprising first cameras and second cameras, the first cameras have a field that is larger than a field of the second cameras.

Advantageously, the first cameras are color cameras, and the second cameras are monochrome camaras, or vice versa.

In accordance with a particular characteristic, the device further comprises a rotary prism mounted between at least one of the cameras and a porthole. The rotary prism is actuated by a motor drive assembly controlled by a control unit that is also connected to an inertial measurement unit for measuring movements of the ring.

The rotary prism thus enables the camera to scan and/or to be stabilized azimuthally. The use of a rotary prism may also reduce the blur in the images of the camera that is caused by the movements and shakes of the ring.

Preferably, at least one of the cameras is mounted on a platform that is stabilized in elevation.

Like the rotary prism, the platform makes it possible to reduce the blur caused by the movements and shakes of the ring. The optical range of the camera, and thus of the device, is then increased.

In a particular manner, at least one of the cameras is a multi-field camera. The use of such a camera makes it possible, in particular, to choose to give preference either to the width of the field covered by the device, or else to the range of the camera.

DESCRIPTION OF THE FIGURES

The invention can be better understood on reading the following description that is given merely by way of non-limiting illustration of the invention.

Reference is made to the accompanying drawings, in which.

DETAILED DESCRIPTION OF PARTICULAR EMBODIMENTS OF THE INVENTION

Figure 1:
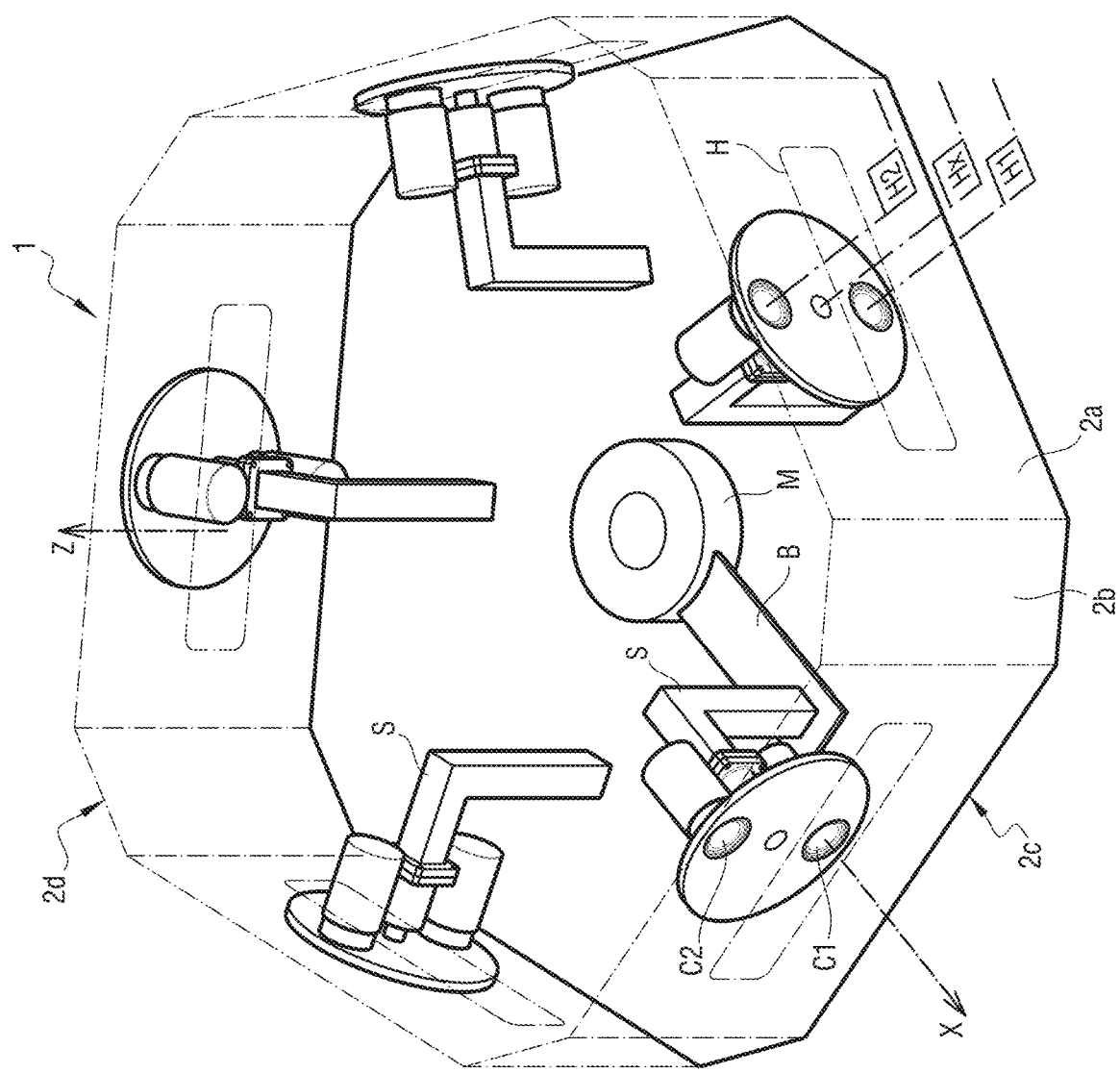
FIG. 1 is a perspective view of a particular embodiment of a proximal monitoring device of the invention.

FIG. 1 shows a first embodiment of the proximal monitoring device of the invention, given overall reference 1.

The proximal monitoring device 1 includes a ring 2 that forms a housing and that is substantially centered on a vertical axis. The ring 2 has an outer outline that is mainly in the shape of a regular pentagon, and that has an outer side surface made up of five main faces 2a of identical size that are interconnected by secondary faces 2b of smaller size via common edges.

In its center, each of the main faces 3a is provided with a porthole H of substantially rectangular shape and, in this example, occupying the lower half of the main face 3a.

The ring 2 also has a bottom surface 2c connected to the lower edges of the main faces 2a and to the lower edges of the secondary faces 2b. In the same way, the ring 2 also has a top surface 2d connected to the upper edges of the main faces 2a and to the upper edges of the secondary faces 2b.

The main faces 2a, the secondary faces 2b, the bottom surface 2c and the top surface 2d of the first ring 2 form a volume in which five first cameras C1 and five second cameras C2 are arranged, all of the cameras pointing towards the outside of the ring.

The shooting axes of the first cameras C1 extend in a plane H1 that is substantially horizontal, i.e. in a plane orthogonal to the axis Z of the ring 2, while intersecting the axis Z and while passing through the centers of the portholes H. The fields of the first cameras C1 are thus distributed angularly around the ring 2, and the first cameras C1 are distributed symmetrically on the inside of the ring 2.

The first cameras C1 are sensitive to frequencies in the visible range, and the distance between the first cameras C1 and the portholes H is such that the fields of the first cameras C1 are not limited by the dimensions of the portholes H.

The shooting axes of the second cameras C2 extend in a plane H2 that is substantially parallel to the plane H1, i.e. in a plane orthogonal to the axis Z of the ring 2, while being aligned vertically with the shooting axes of the first cameras C1. The fields of the second cameras C2 are thus distributed angularly around the ring 2 in a manner identical to the fields of the first cameras C2, and the second cameras C2 are distributed symmetrically on the inside of the ring 2.

The second cameras C2 are sensitive to frequencies in the infrared range and the dimensions of the portholes H do not enable the second cameras C2 as they are to see outside the ring 2.

The portholes H are made of a material suitable for protecting the cameras from outside attack while also being transparent to radiation having wavelengths lying in the sensitivity ranges of the cameras C1, C2.

For example, the first cameras C1 and the second cameras C2 of the ring 2 have the following characteristics:

|  | Camera C1 | Camera C2 |
| --- | --- | --- |
| Range | 4 km | 4 km |
| Resolution | 3840 × 60 | 3840 × 60 |
| Field | 20° × 12° | 20° × 12° |

The first cameras C1 and the second cameras C2 are mounted in pairs on bracket plates P of circular shape that are arranged parallel to the main faces 2a. Each bracket plate P thus receives one of the first cameras C1 and one of the second cameras C2, both of the cameras facing the same main face 2a. The bracket plates P are mounted to move in rotation on supports S about axes X that are orthogonal to the main faces 2a of the ring 2. The axes X intersect the axis Z and extend in a plane Hx situated midway between the planes H1 and H2 of the shooting axes of the cameras C1 and C2.

The bracket plates P rotating through 180° about their axes of rotation X makes it possible to interchange the positions of the first cameras C1 and of the second cameras C2 and thus to place either the camera C1 or the camera C2 in the same pair behind each porthole H. The first cameras C1 are used to provide daytime proximal monitoring and the second cameras C2 are used to provide nighttime proximal monitoring.

Four of the five supports S are secured to the inside surface 2c of the ring 2. One of the five supports S is secured to an arm B mounted to move in rotation about the axis Z via a motor M. The arm B and the motor M thereby enable one of the first cameras C1 and one of the second cameras C2 to scan azimuthally in a plane normal to the axis Z of the ring 2.

Naturally, the first cameras C1 are not necessarily identical. Due to the presence of the scanning device B, M, it is possible, for example, to imagine that the first camera C1 and the second camera C2 that are fastened to the bracket plate S mounted to move in rotation about the axis Z may each have a field smaller than the field of the other first cameras C1 and smaller than the field of the other second cameras C2, in particular parallel to the azimuth scanning plane.

Although in FIG. 1, in order to make the figure simpler, only one of the supports is mounted to move, all five supports S may be moving supports. In which case, by way of example, cameras may be used that have a field angle, parallel to the scanning plane, of 20°, and the motors M may be controlled to obtain scanning of each camera through an angle of 52°. The cameras then cover a field of 360° overall.

It could also be imagined to make provision for the first cameras C1 to be color cameras and for the second cameras C2 to be monochrome cameras, or indeed for the first cameras C1 and/or for the second cameras C2 to be multi-field cameras.

Advantageously, each support S may be mounted, in a manner known per se, on a platform that is stabilized in elevation so as to reduce the motion blur effect on the images acquired by the first cameras C1 and by the second cameras C2. Each camera or pair of cameras may thus be equipped with a mechanical image stabilization device so as to reduce the motion blur effect on the images acquired by the cameras. The mechanical image stabilization device may, in a manner known per se, include a moving plate to which the camera is secured. The inclination of the moving plate, and thus the inclination of the camera, is controlled by electric motors, and a linear sweep in two directions of the shooting plane is controlled by two linear actuators. The electric motors and the linear actuators are controlled by a control unit that is also connected to angular rate sensors and to accelerometers so as to compensate for the movements and shakes of the housing or of the vehicle provided with the device that are perceived by said angular rate sensors and accelerometers.

The entire set of cameras may also be fastened to a stabilized common support. Stabilization is particularly advantageous when the device equips a vehicle or is subjected to vibration.

Figure 2:
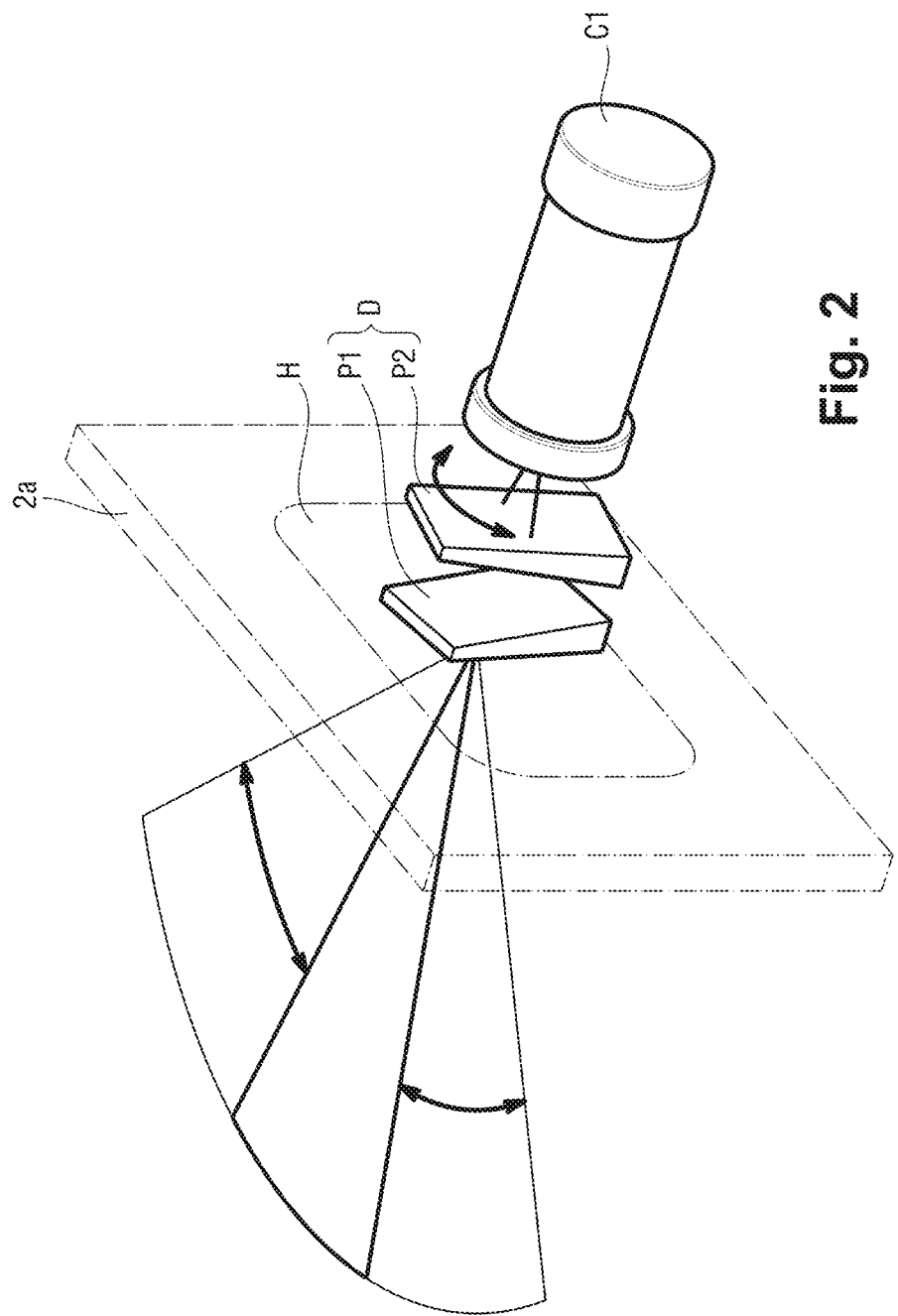
FIG. 2 is a perspective view of a variant of the proximal monitoring device shown in FIG. 1.

As shown in FIG. 2, the scanning device B, M may be replaced with a rotary prism D that is also known as a "Risley prism pair" or as a "wedge prism pair", arranged between the first camera C1 and the porthole H. In a manner known per se, the rotary prism D comprises two prisms V1, V2 that are mounted to turn relative to each other about the shooting axis of the first camera C1. Each prism V1, V2 is driven in rotation by a motor controlled by a control unit connected to an inertial measurement unit for measuring movements of the ring 2. It can be understood that the relative rotation of the prisms V1, V2 modifies the angle of the inlet face of the rotary prism D relative to the shooting axis of the camera so as to deflect a portion of said shooting axis. The rotary prism D thus makes it possible to achieve deflections of the shooting axis of the first camera C1 that may lie in the range −30° to +30° on either side of a central position.

Naturally, the invention is not limited to the embodiments described but rather it encompasses any variant lying within the scope of the invention as defined by the claims.

Although, in this example, the ring 2 has five first and second cameras, the number of cameras may be different.

The term "camera" is used to mean at least one optronic sensor optionally equipped with an optical system comprising one or more lenses.

The sensors of the infrared cameras may optionally be cooled.

The ring may have cameras of one type only.

The cameras may be of a plurality of types without them being mounted in pairs on rotary bracket plates.

The ring may have n cameras, each of which has a field angle A less than 360°/n in a scanning plane. If all of the cameras have the same field angle A, it is necessary for each camera to be mounted to move through a scanning angle of 360°/n−A.

Otherwise, the cameras may have field angles and scanning angles that are different.

The ring may have a shape that is different from the ones described. In particular, it may have a cylindrical side surface of circular outline.

The housing that, in this example, is ring-shaped, may have some other shape.

Depending on the applications, the housing may or may not be weatherproof or watertight.

The portholes may be plane or have some other shape and, for example, be slightly curved about a horizontal axis.

The ring may be mounted at the top of a stationary or rotary mast.

The first cameras C1 may have a field smaller than the field of the second cameras C2, and vice versa. The range of the second cameras C2 may, for example be half the range of the first cameras C1, or vice versa.

The rotary prism may comprise a different number of prisms, e.g. three prisms.

The stabilization device and/or the azimuth scanning device may have structures other than those described. Thus, an optical system may be arranged in the center of the ring. The optical system comprises a prismatic mirror having an axis that coincides with the axis Z. The mirror is secured to a moving plate, the inclination of which and the angular position of which about the axis Z are controlled by electric motors controlled by a control unit connected to angular rate sensors so as to compensate for the movements and shakes of the ring or of the vehicle provided with the device. Instead of pointing towards the portholes so as to be aimed at the outside of the first ring, the cameras point towards the mirror so as to be aimed at the porthole by reflection off the mirror. In a nominal position, the mirror is shaped in such a manner that the reflected shooting angles of the cameras pass through the portholes substantially midway up the height of them. A modification in the inclination of the mirror enables the cameras to scan in elevation, and a movement in rotation of the mirror enables the cameras to scan azimuthally. The optical system thus forms a stabilization and scanning device that is common to all of the cameras. It should be noted that the optical system may be modified so as to provide stabilization only or so as to provide azimuth scanning only.

The numerical characteristics of the cameras are given merely by way of illustration, and should be determined with a view to the desired performance of the device for the application being considered.

The invention claimed is:

1. A proximal monitoring device, comprising a housing defining a volume in which a plurality of cameras are mounted that have fields that are angularly distributed around the housing, at least one of the cameras being associated with an azimuth scanning device for scanning azimuthally in a plane that is normal to a central axis of the housing, wherein the cameras are mounted in pairs on moving bracket plates for interchanging the positions of the cameras, each pair being mounted on a respective moving bracket plate, and the cameras in each pair being sensitive to mutually different wavelengths.

2. The device according to claim 1, wherein the camera associated with the scanning device has a field that is smaller than a field of the other cameras, at least parallel to the scanning plane.

3. The device according to claim 1, the cameras comprising first cameras and second cameras, and the first cameras having a field that is larger than a field of the second cameras.

4. The device according to claim 3, wherein the first cameras are color cameras, and the second cameras are monochrome camaras, or vice versa.

5. The device according to claim 1, further comprising a rotary prism mounted between at least one of the cameras and a porthole, the rotary prism being actuated by a motor drive assembly controlled by a control unit that is also connected to an inertial measurement unit for measuring movements of the housing.

6. The device according to claim 1, wherein at least one of the cameras is mounted on a platform that is stabilized in elevation.

7. The device according to claim 1, wherein at least one of the cameras is a multi-field camera.

8. The device according to claim 1, wherein each of the cameras is associated with an azimuth scanning device for scanning azimuthally.

* * * * *